July 31, 1934.  F. A. GERLACH  1,968,679
ROTARY CYLINDER STRUCTURE
Filed Nov. 3, 1932
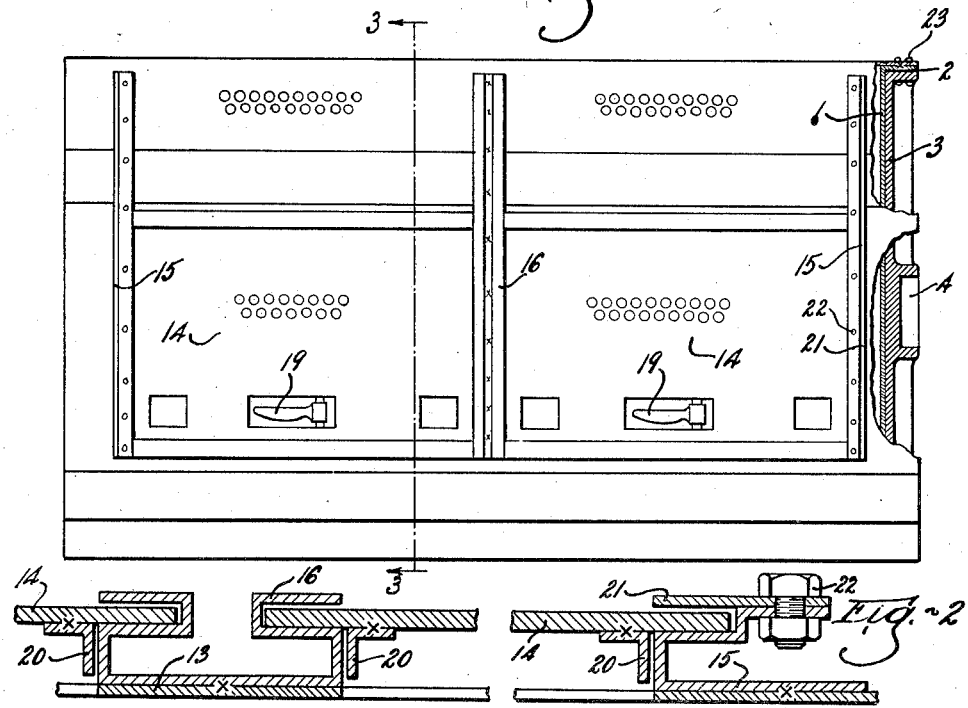
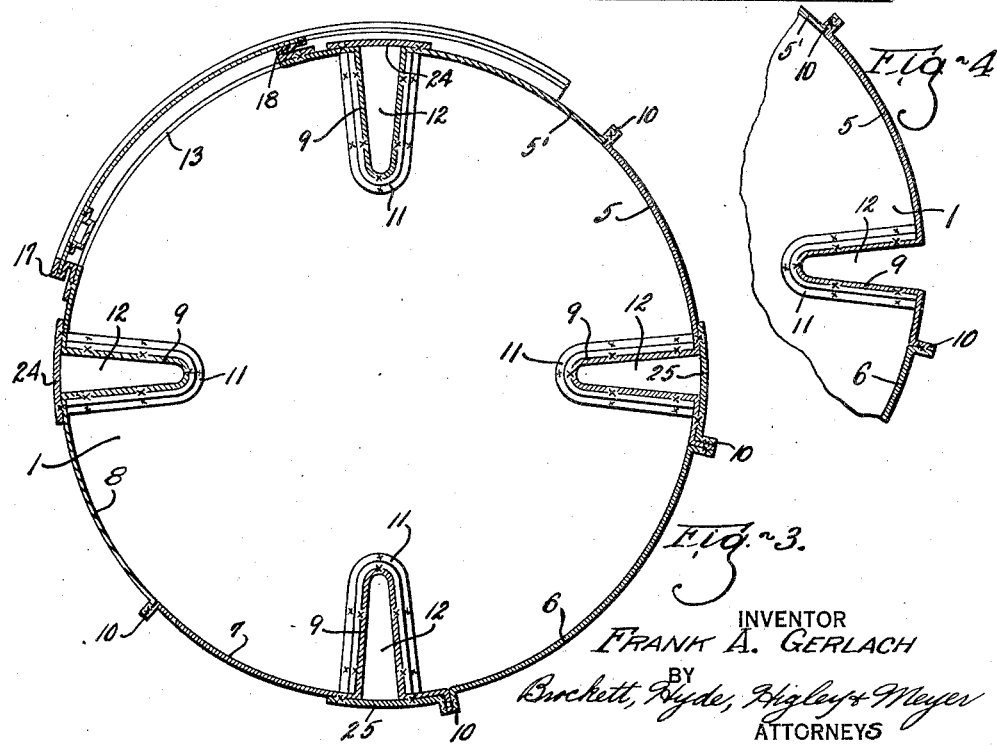
INVENTOR
FRANK A. GERLACH
BY
Burkett, Hyde, Higley & Meyer
ATTORNEYS Patented July 31, 1934

1,968,679

UNITED STATES PATENT OFFICE 1,968,679

ROTARY CYLINDER STRUCTURE

Frank A. Gerlach, Cincinnati, Ohio, assignor to The American Laundry Machinery Company, Cincinnati, Ohio, a corporation of Ohio Application November 3, 1932, Serial No. 641,025

4 Claims. (Cl. 68—18)

My invention relates to a washing machine cylinder, and particularly to a washing machine cylinder embodying a construction and arrangement of parts such that the cylinder may be readily fabricated with spot welding as the means for securing the various parts together. In accordance with my invention, this is accomplished by having the stations at which the cylinder parts are to be spot welded together in accessible positions to the welding electrodes so that a more efficient and speedier fabrication of the cylinder can be obtained and with the result of a more durable union of the various parts and a sturdier construction in the finished cylinder.

Further, the cylinder is so constructed as to minimize the danger of twisting the cylinder out of line by the stresses and strains set up in rotatably driving the cylinder, it being of the type that is driven from its ends, and the cylinder is so constructed that the adjoining edges of the cylinder head sheets at the cylinder body sheet seams extend radially outwardly from the circumference of the cylinder to thereby provide a smooth and even surface inside the cylinder which will produce less wear on the goods and reduce the possibility of the goods being caught and damaged at such seams during the washing process to a minimum. Also, the cylinder body sheets and cylinder lifting ribs are formed integrally which eliminates a multiplicity of separate parts. In addition to this, a cylinder door guide structure and door stops are provided which will permit the fabrication and assembly of a door in a minimum of time and with a minimum of expense, the guides being such that the door is readily removable therefrom.

One embodiment of my invention may be seen in the accompanying drawing wherein similar characters of reference designate corresponding parts, and wherein:

Fig. 1 is a front elevation, with parts broken away and parts in section, showing a cylinder constructed in accordance with my invention; Fig. 2 is a sectional view showing the door slide construction; Fig. 3 is a sectional view taken on the line 3—3 of Fig. 1; and Fig. 4 is a fragmentary sectional view showing the cylinder body sheet and lifting rib construction.

In the drawing, I have shown a cylinder consisting of annular head sheets 1 having a flange 2 adapted to receive a transmitter 3 which is provided with a recessed portion 4 for a driving or a supporting connection with a gudgeon not shown. While one end only of the cylinder is shown in detail, it will be understood that the construction is identical at both ends of the cylinder.

The outer wall of the cylinder is made up of separate sheets 5', 5, 6, 7 and 8, each of which is bent to form a lifting rib 9, the separate sheets at their abutting edges being up-turned at substantially 90° angle as at 10 to provide abutting surfaces and a joint outside of the cylinder which will be accessible to both electrodes of a spot welding apparatus outside of the cylinder.

Stirrup members 11 are provided for reinforcing the connection between the lifting ribs 9 and the head sheets and transmitters 1 and 3, these stirrup members embodying two separate surfaces, one of which lies flat against the face of the head sheet 1 and the other of which lies flat against the outer surface of the lifting ribs. Such two surfaces are spot welded to the head sheets and the lifting ribs respectively, and it will be understood that the stirrup members are disposed adjacent coincidental grooves in the head sheets and transmitters that provide the openings 12 through which the lifting ribs extend outwardly through the head sheets and transmitters. Such arrangement of the head sheets, transmitters and lifting ribs provides a rigid structure, when the parts are secured together, that reduces possibility of injury to the cylinder through torsion or twisting stresses set up by rotatably driving the cylinder from its ends.

As shown, the cylinder sheets 5', 5, 6, 7 and 8 are of such size and so arranged as to provide an opening 13 in the cylinder that is covered and uncovered by means of a door 14 slidable from closed to open position or vice versa in door guides 15 and 16. A lower door abutment 17 and an upper lock and stop strip 18 are provided for limiting the extent of sliding movement of the door. These members 17 and 18, in addition to acting as door movement limiting means, are also constructed to restrain the upper and lower edges of the door from bulging outwardly or otherwise being distorted due to the work in the cylinder pounding against the door during cylinder rotation. A suitable locking means 19 is provided for locking the door in its closed and opened position.

Referring to Fig. 2 of the drawing, I have shown a cylinder door and slide construction, constructed in accordance with my invention, wherein the door 14 consists of a plate member having a pair of guide strips 20 secured to the under surface thereof and adjacent each edge of the door to maintain the door in alignment while it is being slidably opened or closed. Likewise, these strips 20 serve to maintain the door 14 in proper aligned position in a pair of door slide members 15 and 16.

As shown, the center slide 16 is, in this instance, of a nature to accommodate a door on either side thereof and includes a member that may be spot welded to the cylinder. Of course, a member adapted for a single door only may be provided if desired. The outer slide 15 is constructed to accommodate the outer edge of a door and includes a base member that may be spot welded to the cylinder and a removable plate 21 which will permit removal of the door for replacement or repair, the plate being held to the base member by bolts or the like 22.

In the assembly of this cylinder structure, the first step is to weld the lifting rib stirrups 11 to the cylinder head sheets 1 adjacent the grooves therein which provide the openings 12. Then, starting with the cylinder body sheet 8, such cylinder body sheet is placed relative to the head sheets 1 with the lifting rib 9 in its corresponding opening 12 and the lower door abutment is or possibly has been previously welded to the edge of the cylinder body sheet adjacent what is to be the opening 13. Continuing, the lifting rib portion 9 of the body sheet is welded to the surface of the stirrup 11 that abuts the outer surface thereof.

Next, the cylinder body sheet 7 is placed in position with the lifting rib 9 that forms a part thereof in the corresponding opening 12 and the abutting bent edges of the body sheets 8 and 7 extending radially outwardly from the surface of the cylinder as at 10 are welded together. Next, the rib 9 is welded to the abutting surface of the stirrup 11. Continuing in the construction of the cylinder, the cylinder body sheet 6, which has no rib 9 forming an integral part thereof but serves as a fill sheet and has both of its edges bent outwardly at an angle, is placed in position and its bent edge abutting the bent edge of the sheet 7 as at 10 is spot welded thereto. Then, the cylinder body sheet 5 is placed in position with the rib 9 that forms an integral part thereof in its corresponding opening 12 of the head sheet 1 and the remaining outwardly bent edge of the sheet 6 and the abutting bent edge of the sheet 5 are welded together. Following this, the abutting surfaces of the rib 9 and the stirrup member 11 are secured together by spot welding.

The last cylinder body sheet to be assembled is the sheet 5' which is placed in position as the others with the lifting rib 9 that forms a part thereof in its corresponding opening 12, it being noted that the upper lock and stop strip member 18 is welded to and carried by this sheet. Only one edge of this sheet is bent outwardly and this edge abuts the outwardly bent edge of the cylinder sheet 5 to which it is spot welded. Continuing, the abutting surfaces of the lifting rib 9 and the stirrup member 11 are spot welded together which completes the cylinder structure except for the operation of welding the door slide members 15 and 16 in proper position and assembling the doors therein.

After all of these welding operations have taken place, the ends of the cylinder body sheets are welded to the flanges 2 of the head sheets 1 and then the cylinder body sheets, head sheets, and transmitter are riveted together as by means of rivets 23, the transmitter being, in this instance, of too great a thickness to permit satisfactory spot welding as a means for securing these parts together.

Referring to Fig. 3, I have provided rib cover plates 24 and 25 which may be welded over the openings 12 at the circumference of the cylinder to prevent passage of treating fluid into or out of the cylinder through the lifting ribs. It will be noted that the cover plates 24 conform substantially to the contour of the cylinder throughout whereas the cover plates 25 have one bent edge that may, as shown, be welded to the adjacent joint between the cylinder body sheets formed by the outwardly bent edges thereof as hereinbefore described. These cover plates may be entirely omitted if desired.

Referring to the drawing and the preceding description, I have provided a cylinder structure wherein the parts are so designed and arranged that the cylinder readily lends itself to fabrication by spot welding as a means for connecting the parts together, the cylinder parts being so constructed and arranged as to provide a rigid structure which will resist disalignment of parts due to twisting stress resulting from rotatably driving the cylinder at its end or ends. Further, I have provided a cylinder structure that is relatively simple and have included in this cylinder structure a novel type of door and door guiding means which, as the remainder of the cylinder, readily lends itself to fabrication by spot welding and which permits of easy assembly or removal of the doors in the fabrication of the cylinder or for replacement or repair purposes respectively.

What I claim is:

1. In a cylinder of the class described, a pair of cylinder-wall sheets having adjacent longitudinal edges out-turned in abutting relation and welded together, one of said wall sheets having a part inturned adjacent said joint to form an integral longitudinally-extending channel-shaped lifting rib, and a generally-circular head sheet having a recess receiving said lifting rib, and on either side thereof an outwardly turned flange underlying the corresponding wall sheet part and welded to the latter.

2. In a cylinder of the class described, a pair of cylinder-wall sheets having their adjacent longitudinal edges out-turned in abutting relation and welded together, one of said wall sheets having a part inturned to form an integral channel-shaped lifting rib longitudinally extending adjacent said joint between the wall sheets, and a cover plate overlying said lifting rib and welded to the wall sheet parts on opposite edges of the rib and having an out-turned edge in abutting relation with the near out-turned wall sheet edge and welded to the latter.

3. In a cylinder of the class described, wall sheets arranged to provide a cylindrical wall and including a pair of wall sheets having adjacent longitudinal edges out-turned in abutting relation and welded together, said cylindrical wall having an opening, a door for said opening mounted for circumferential sliding, said parts being so disposed that said joint at said out-turned edges provides a stop for locating said door in open position.

4. In a cylinder of the class described, wall sheets arranged to provide a cylindrical wall, said wall having an opening, a door for said opening, and means mounting said door on said wall for control of said opening by segmental sliding, said means comprising door guides arranged on the curved side edges of said opening and there secured with said wall by welding, one of said guides including a base part so secured and a plate removably secured to said base part and having a part overlying the side edge of the door to permit removal of the latter.

FRANK A. GERLACH.